UNITED STATES PATENT OFFICE.

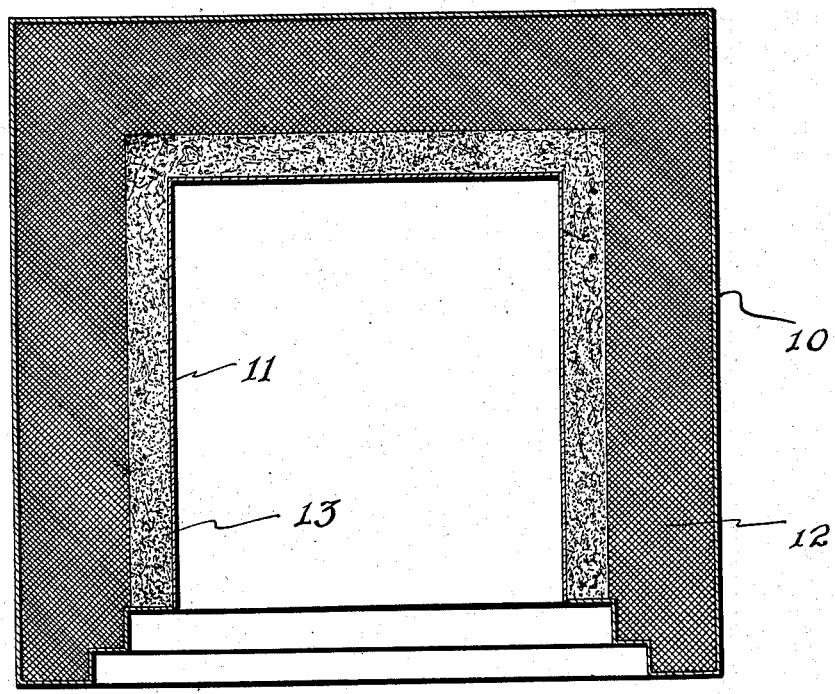

RALPH H. DICK AND CARL F. WOLTERS, OF MARIETTA, OHIO, AND ROSER B. SUTTER, OF NEWARK, NEW JERSEY, ASSIGNORS TO THE SAFE-CABINET COMPANY, OF MARIETTA, OHIO, A CORPORATION OF OHIO.

HEAT-RESISTING SAFE OR CABINET.

1,350,363.     Specification of Letters Patent.     Patented Aug. 24, 1920.

Application filed March 28, 1917. Serial No. 158,057.

*To all whom it may concern:*

Be it known that we, RALPH H. DICK, a citizen of the United States, and a resident of Marietta, Ohio, CARL F. WOLTERS, a subject of the Emperor of Germany, and a resident of Marietta, Washington county, Ohio, and ROSER B. SUTTER, a citizen of the United States, and a resident of Newark, Essex county, New Jersey, have invented new and useful Improvements in Heat-Resisting Safes or Cabinets, of which the following is a specification.

Our invention relates to a construction for the container walls of a light weight safe or heat resisting cabinet, in which we have endeavored to embody the cardinal principles of strength, economy, lightness of weight, and an efficient resistance to the entrance of excessive heat to the interior of the safe or cabinet.

For a long period of time it was thought that thick iron walls with a filler of concrete or other heavy substance of like properties, were the most effective heat resisting agents; but as this construction involved excessive weight and bulk, and as concrete in itself is not a good heat insulating medium, and disintegrates when exposed to high temperatures, the tendency was toward a reduction of weight and the employment of a more effective and dry insulation of low specific gravity, requiring a smaller amount of space and thereby reducing the bulk and weight of the structure.

This dry insulation, however, has one disadvantage, namely, it takes up and retains so much heat, that subsequent to the subjection of the outer walls of the safe or cabinet to an excessive temperature, this heat would progress into the interior of the structure even after the fire is over, to the possible detriment of the contents therein.

The object of our invention, therefore, is, to provide an insulating means for a safe or cabinet, in which by using successive layers of material with different specific gravities and properties, the greatest possible protection against heat can be obtained in a construction of very light weight and small bulk.

In the preferred form shown herewith, we show a combination of dry and wetting heat insulation, the former of which is of very low specific gravity and heat conductivity, thereby making it possible to use the most effective quantity of inner wetting insulation of a higher specific gravity, without bringing the total weight and bulk of the combined heat insulation means up to too high a point; the wetting insulation serving by development of steam under heat to protect the contents of the interior of the safe and being itself protected against premature or excessive development of steam by the dry insulation outside thereof.

The inner wetting insulation may consist of a material with a vast number of minute air cells in which is stored by immersion, a salt of stable character having a high content of water of crystallization, which is a permanent and ever ready heat absorber and steam producer. This serves when subjected to high temperatures as a heat consumer and also as a means of wetting down the contents of the safe or cabinet.

At a temperature of 212° Fahrenheit, the water of crystallization in the salt becomes steam and acts to reduce the temperature of the heat. We prefer water chemically bound in a non-deliquescent salt as water of crystallization because it is retained in a solidified state for an indefinite length of time and is not subject to evaporation under ordinary atmospheric conditions, whereas water stored in the insulation and held by a superficial air tight coating is effective only for a limited time, and might injure the said insulation or the metal walls of the safe or cabinet.

For instance, epsom salts $MgSO_4$ 7 aq. which carries 51% of its weight of water of crystallization—1 pound of the salt over 8 fluid ounces of water in a solidified state—may be used for this purpose although we do not wish to limit ourselves to the use of this one salt; which is only mentioned as an example.

We are familiar with the structures in the art in which salts are stored in metallic containers located in the insulating linings, and also with the structures in which the said salts are packed in the form of cakes or slabs between the insulation linings.

In our experience the first named method is objectionable because the thermal conductivity of the insulation linings is materially heightened by the presence of the metallic containers; and the second method is open to the objection that under high temperatures the said slabs or cakes would melt down and give off the water of crystallization, thereby leaving large air chambers which would permit free circulation of air, thereby impairing the value of the insulation as a heat resistant.

If such salts are mixed with concrete, plaster or the like, in making the insulation lining the setting qualities, strength and durability thereof are much impaired.

We overcome these defects by making the insulation lining without the salt, using a porous material with a vast number of separate minute air cells which is subsequently immersed in a strong solution of the salt. The water therein serving as the solvent soon evaporates and the salt crystallizes in the air cells driving out the air and forming a hard, dry, but—as is obvious—heavier product.

A material of low specific gravity of great heat resisting and insulating power which will absorb from 250 to 300% of its own weight of an epsom salt solution of 25° Baumé with a content of 45.5% of salt or a volume equal to from 70% to 80% of its own volume, is preferred for our purpose.

As this salt filled material has a higher specific gravity and is a less effective heat insulator because of the loss of the air from the great number of small air cells, we have found it advisable to use between the walls of the safe or cabinet a dry insulation not charged with the salt on the inner side of the outer wall and the wetting insulation charged with the salt between the said dry insulation and the inner wall.

The dry insulation will delay the progress of heat toward the interior of the safe or cabinet for a long time as it has a thermal conductivity of only 6 to 15 British thermal units per square foot per degree Fahrenheit, one inch thick, per 24 hours as against the 125 B. T. U. of concrete; and a specific gravity much less than that of concrete.

Between the said dry insulation and the inner wall of the safe or cabinet the salt charged insulation is placed. If subjected to a high temperature, as the heat progresses through the dry insulation, when it reaches the wetting or salt charged insulation, it acts upon the salt and the solidified water of crystallization is converted into steam whereby the heat is reduced.

It is important that this steam should be liberated gradually to avoid the usual consequences of confining the same, and the said dry insulation operates to this end on account of its low thermal conductivity. It will be noted that our construction has the further advantage of supplying the steam at a time when it is most needed, as the dry insulation is apt to lose some of its value under an excessive temperature maintained for a long period of time.

The salt now calcined and finally molten, shrinks, opens the air cells and the material regains its former insulating power, thus adding another obstacle to the further progress of the heat toward the interior. The steam being prevented from escaping by the air tight walls and doors of the structure follows the line of least resistance and proceeds into the interior of the safe or cabinet through the joints of the inner wall thereof or otherwise keeping the air and contents moist and harmless against the temperature. The heat coming through the walls is also reduced by the absorption due to liquefaction and vaporization of the salt.

In the drawing herewith:—

The figure is a horizontal sectional view of a safe or cabinet showing in detail the application of our invention.

As shown in the drawing, 10 is the outer metallic wall of the safe or cabinet, 11 is the interior wall, 12 is the dry insulation, and 13 is the wetting insulation. These walls are composed of sheet metal and the joints of the inner one permit the passage of vapor generated under the heat of a fire from the inner wet insulation to the interior of the cabinet.

The dry insulation 12, which has a very low specific gravity may be either in one block, or in two or more slabs or layers. The dry insulation may be composed of asbestos, ground cork and binders, or any equivalent or suitable material. These layers or slabs of dry insulation may consist of two forms of zenithern, a known insulating material on the market.

The wetting insulation 13 is a material of a higher relative specific gravity, with a vast number of minute air cells and it is prepared for this purpose by immersion in a salt solution which will retain its water of crystallization indefinitely in the said air cells until subjected to a temperature of 212 degrees Fahrenheit, when it will be converted to steam, and will thereafter pass to the interior of the safe or cabinet, where it will lower the temperature, and moisten the contents, thereby protecting them against the effects of the high temperature. The heat coming through the walls is also reduced by the absorption due to liquefaction and vaporization of the salt. This second or wetting insulation may consist of a material having as a basis, for instance, Kieselguhr or any diatomaceous earth having minute air cells in which may be stored by immersion any salt of stable character with a high content of water of crystallization, which when subjected to a high temperature becomes steam.

The liberation of the steam from the wetting insulation 13, does not affect the structure thereof, and it still remains a most effective insulator.

Our invention provides a safe or cabinet construction which will most efficiently protect the contents thereof against the results of excessively high temperatures for the following reasons: When the heat from fire outside of the said safe or cabinet attacks the outer or exterior metallic wall 10, the sheet metal thereof offers but slight resistance to the passage of the said heat to the dry insulation 12, but the latter, having a very low thermal conductivity obstructs the passage of the said heat toward the interior of the safe or cabinet so effectively that it is reduced many degrees before it arrives at the point where the wetting insulation 13 intervenes between the dry insulation 12 and the interior wall 11 of the safe or cabinet.

The water of crystallation in the insulation 13 becomes steam when a temperature of 212 degrees Fahrenheit is reached and serves thereafter not only to moisten and preserve the contents of the safe or cabinet but also to reduce the intensity of the heat in its passage to the interior of the safe or cabinet.

This applies with equal force to the heat which inevitably makes its entrance to the interior of structures of this nature, through the joints of the door or doors, when excessive temperatures are caused by fire conditions.

We claim:—

1. A fire-heat resisting document-preserving cabinet constructed with inner and outer sheet metal walls and having an inner wetting insulation disposed outside said inner sheet metal wall and comprising material which under heat gives off steam and operates to retard the entrance of heat to the interior of the safe, and a relatively dry insulation disposed between the outer wall and said wetting insulation and operative to protect said wetting insulation against premature or excessive vaporization.

2. A fire-heat resisting document-preserving cabinet constructed with inner and outer sheet metal walls and having an inner wetting insulation disposed outside said inner sheet metal wall and comprising a porous material carrying a stable salt containing water of crystallization, and a relatively dry insulation disposed between said outer sheet metal wall and said wetting insulation and operative to protect said wetting insulation against premature or excessive vaporization.

3. A fire-heat resisting document-preserving cabinet constructed with an inner sheet metal wall and an outer sheet metal wall and having a wetting insulation disposed outside said inner metallic wall and comprising material which under heat gives off steam and operates by liquefaction and vaporization to retard the entrance of heat to the interior of the safe and to moisten the contents thereof, and a relatively dry insulation disposed between said outer sheet metal wall and said wetting insulation and operative to protect said wetting insulation against premature or excessive vaporization, the inner wall permitting the passage of the generated steam to the interior of the cabinet.

RALPH H. DICK.
CARL F. WOLTERS.
ROSER B. SUTTER.

Witnesses:
MYRNA E. THOMSON,
M. R. WHYTE.